(12) United States Patent
Coffey et al.

(10) Patent No.: US 7,839,604 B1
(45) Date of Patent: Nov. 23, 2010

(54) DISK DRIVE SUSPENSION ASSEMBLY WITH INTEGRATED TRAILING EDGE SHOCK PROTECTION FOR USE WITH MICRO-ACTUATOR TYPE HEAD-GIMBAL ASSEMBLY

(75) Inventors: Jerome T. Coffey, Longmont, CO (US); John F. Harris, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1239 days.

(21) Appl. No.: 11/346,031

(22) Filed: Feb. 2, 2006

Related U.S. Application Data

(60) Provisional application No. 60/649,790, filed on Feb. 3, 2005.

(51) Int. Cl.
   G11B 5/55 (2006.01)
   G11B 21/08 (2006.01)
(52) U.S. Cl. .............. 360/265.9; 360/245.7; 360/265.1
(58) Field of Classification Search .............. 360/265.9, 360/245.7, 265.1, 264.2, 266.3
See application file for complete search history.

(56) References Cited

U.S. PATENT DOCUMENTS

| | | | |
|---|---|---|---|
| 5,754,369 A * | 5/1998 | Balakrishnan ........... 360/264.2 |
| 5,856,896 A * | 1/1999 | Berg et al. ................ 360/245.3 |
| 5,929,326 A * | 7/1999 | Imaino et al. ................ 73/105 |
| 5,959,807 A * | 9/1999 | Jurgenson ................ 360/245.7 |
| 6,021,022 A * | 2/2000 | Himes et al. ............. 360/245.7 |
| 6,078,473 A * | 6/2000 | Crane et al. .............. 360/294.3 |
| 6,376,964 B1 * | 4/2002 | Young et al. ................ 310/311 |
| 7,006,333 B1 * | 2/2006 | Summers ................ 360/294.4 |
| 7,688,553 B1 * | 3/2010 | Williams et al. ......... 360/245.3 |
| 2006/0072247 A1 * | 4/2006 | Yao et al. ................ 360/294.4 |
| 2006/0164763 A1 * | 7/2006 | Yao et al. ................ 360/294.4 |

* cited by examiner

*Primary Examiner*—Brian E Miller
*Assistant Examiner*—Adam B Dravininkas
(74) *Attorney, Agent, or Firm*—Mikel Boeve

(57) ABSTRACT

A disk drive head-gimbal assembly (200) is disclosed, which includes what may be characterized as a flexure (215) with an integrated trailing edge limiter. The head-gimbal assembly (200) includes a deflectable flexure tongue (228) and a bond pad platform (230) that is spaced from this flexure tongue (228). At least one bridge (234) extends between and structurally interconnects the flexure tongue (228) and bond pad platform (230). A slider assembly (136), including a slider positioner (156) and a slider (140), is mounted on the flexure tongue (228). The bond pad platform (230) is used to establish an electrical connection with the slider (140).

16 Claims, 12 Drawing Sheets

DISK DRIVE SUSPENSION ASSEMBLY WITH INTEGRATED TRAILING EDGE SHOCK PROTECTION FOR USE WITH MICRO-ACTUATOR TYPE HEAD-GIMBAL ASSEMBLY

CROSS-REFERENCE TO RELATED APPLICATIONS

This patent application claims priority under 35 U.S.C. §119(e) to U.S. Provisional Patent Application Ser. No. 60/649,790, that was filed on Feb. 3, 2005, that is entitled "INTEGRATED FLEXURE LIMITER," and the entire disclosure of which is hereby incorporated by reference in its entirety herein.

FIELD OF THE INVENTION

The present invention is generally directed to disk drive head-gimbal assemblies and, more particularly, to providing shock prevention for a suspension assembly without requiring a conventional trailing edge limiter in the structure of the suspension, where this suspension assembly is used with a micro-actuator type head-gimbal assembly.

BACKGROUND OF THE INVENTION

Manufacturing disk drives typically entails shipping various disk drive components for assembly/integration at another location. For instance, suspension assemblies are typically assembled/fabricated by one vendor, and are thereafter shipped to another vendor so that a slider assembly may be mounted on the suspension assembly to define what is commonly referred to in the art as a head-gimbal assembly. In one disk drive configuration, the suspension assembly includes a suspension, a flexure mounted to the suspension, a bond pad platform, and a flex cable mounted to the bond pad platform and typically at least a portion of the flexure, while the slider assembly includes a slider positioner (e.g., what is commonly referred to as a micro-actuator, but nonetheless which may include a frame and at least two actuators that act upon the frame) and a slider that is mounted to the slider positioner. Since the bond pad platform is supported by only the flex cable in this instance, it is typical to include what is commonly referred to as a trailing edge limiter in the structure of the suspension to limit the amount that the bond pad platform may move relative to the flexure and the suspension during shipment of the suspension assembly to reduce the potential for damaging the flex cable. This trailing edge limiter of course adds mass to the suspension and has an effect on the performance of the suspension during disk drive operations.

BRIEF SUMMARY OF THE INVENTION

A first aspect of the present invention is embodied by a disk drive head-gimbal assembly that includes a suspension, a flexure, a slider positioner, a slider, and a bond pad platform. The flexure is interconnected with the suspension in any appropriate manner (e.g., spot welding) and includes what is commonly referred to in the art as a flexure tongue. The slider positioner (e.g., what is commonly referred to in the art as a "micro-actuator" or the like) is mounted on the flexure tongue in any appropriate manner (e.g., using an adhesive) and includes a frame, a first actuator of any appropriate type (e.g., a piezoelectric device), and a second actuator of any appropriate type (e.g., a piezoelectric device). The slider in turn is mounted to the frame of the slider positioner such that the slider may be characterized as being indirectly interconnected with the flexure tongue. In any case, another component of the disk drive head-gimbal assembly is what may be characterized as a bond pad platform that is spaced from the flexure tongue. A first structural connection extends between the flexure tongue and the bond pad platform. A first electrical trace is electrically interconnected with the slider using this bond pad platform.

Various refinements exist of the features noted in relation to the first aspect of the present invention. Further features may also be incorporated in the first aspect of the present invention as well. These refinements and additional features may exist individually or in any combination. The first structural connection may be of benefit in relation to restraining/limiting movement of the bond pad platform relative to the flexure during shipment of a suspension assembly (e.g., the suspension, flexure, bond pad platform, and a flex cable that includes the noted first electrical trace) to a vendor that will thereafter mount a slider assembly (collectively the slider positioner with the slider already mounted thereon) on the suspension assembly. That is, the first structural connection may function as an anti-shock device for the shipment of a suspension assembly to a vendor that will integrate a slider assembly with the suspension assembly to define the noted head-gimbal assembly. This functionality is commonly provided by what is characterized as a trailing edge limiter that is part of the structure of the suspension in prior art suspensions. In one embodiment, the suspension used by the disk drive head-gimbal assembly of the first aspect does not include such a trailing edge limiter in the structure of the suspension. Instead, the disk drive head-gimbal assembly of the first aspect relies upon the first structural connection to provide an anti-shock function at least during shipment. However, the suspension used by the disk drive head-gimbal assembly of the first aspect may still include a trailing edge limiter in the structure of the suspension.

The disk drive head-gimbal assembly of the first aspect may be incorporated into a disk drive such that the first structural connection remains intact during normal disk drive operations (e.g., during rotation of a corresponding data storage disk and the exchange of signals between this data storage disk and one or more transducers that are embedded in or otherwise integrated with the slider). In this case, the existence of each first structural connection between the flexure tongue and bond pad platform should not adversely affect the ability of the slider positioner to change the position of the slider to an undesired degree. Another option would be for the disk drive head-gimbal assembly to retain the noted configuration until the slider assembly (again, collectively the slider positioner, with the slider mounted to the frame of the slider positioner) is mounted to the flexure tongue, but to sometime thereafter breach at least one (and including each) first structural connection that extends between the flexure tongue and the bond pad platform in any appropriate manner (e.g., fracture; remove at least in part). In either case, the disk drive head-gimbal assembly of the first aspect may be used in a disk drive of any appropriate type, size, shape, and/or configuration.

The first structural connection that extends between the flexure tongue and the bond pad platform in the case of the first aspect may be of any appropriate size, shape, and/or configuration, may be formed from any material or combination of materials, and may be disposed at any appropriate location. In one embodiment, a single first structural connection exists between the bond pad platform and the flexure tongue, and such is disposed along a central, longitudinal reference axis of the suspension. In another embodiment, multiple first structural connections exist between the bond pad platform and the flexure tongue. Any appropriate number of first structural connections may extend between the bond pad platform and the flexure tongue, and multiple first structural connections may be disposed in any appropriate arrangement.

It may be appropriate to integrally form the flexure tongue, at least one (and thereby including each) first structural connection, and the bond pad platform used by the disk drive head-gimbal assembly of the first aspect such that these three components are formed from a common material and such that no joint of any kind exists in this structure (e.g., no joint between the flexure tongue and the first structural connection; no joint between the first structural connection and the bond pad platform). It may also be appropriate for the first structural connection to be separately attached to the flexure tongue, to be separately attached to the bond pad platform, or both. For instance, what may be characterized as a dielectric substrate may be used to integrate the various electrical traces with the disk drive head-gimbal assembly. This dielectric substrate may include a bond pad platform section that is disposed on and appropriately attached to the bond pad platform (e.g., using an appropriate adhesive). The first structural connection may be formed from the dielectric substrate, and may extend from its bond pad platform section to the flexure tongue where it is disposed on and appropriately attached to the flexure tongue (e.g., using an appropriate adhesive). The bond pad platform section of the dielectric substrate and the first structural connection could be integrally formed in this case (e.g., no joint between the bond pad platform section of the dielectric substrate and the first structural connection).

Typically, the flexure tongue used by the disk drive head-gimbal assembly of the first aspect will deflect during normal disk drive operations such that the slider flies in a desired orientation (e.g., where its leading edge is spaced further from the corresponding data storage disk than the slider's trailing edge). For instance, first and second gimbal legs may flexibly support the flexure tongue, with the flexure tongue at least in effect cantilevering from these gimbal legs.

What is oftentimes referred to as a flex cable may be mounted on the bond pad platform used by the disk drive head-gimbal assembly of the first aspect. That portion of the flex cable that is disposed on the bond pad platform would typically include a plurality of bond pads or the like. An appropriate bond (e.g., a ball bond) would then electrically and structurally interconnect a bond pad on the bond pad platform with a corresponding pad on typically the trailing edge of the slider (e.g., to establish a number of desirable interconnections with the slider, such as for read/write operations, for fly height control). Another portion of the flex cable (not disposed on the bond pad platform as described) may include one or more electrical traces and associated bond pads for providing electrical signals to the slider positioner.

A second aspect of the present invention is embodied by a disk drive head-gimbal assembly that includes a suspension, a flexure, a slider positioner, a slider, and a bond pad platform. The flexure is interconnected with the suspension in any appropriate manner (e.g., spot welding) and includes what is commonly referred to in the art as a flexure tongue. The slider positioner (e.g., what is commonly referred to in the art as a "micro-actuator" or the like) is mounted on the flexure tongue in any appropriate manner (e.g., using an adhesive) and includes a frame, a first actuator of any appropriate type (e.g., a piezoelectric device), and a second actuator of any appropriate type (e.g., a piezoelectric device). The slider in turn is mounted to the frame of the slider positioner such that the slider may be characterized as being indirectly interconnected with the flexure tongue. In any case, another component of the disk drive head-gimbal assembly is what may be characterized as a bond pad platform that is spaced from the flexure tongue. A first electrical trace is electrically interconnected with the slider using this bond pad platform. Yet another component of the disk drive head-gimbal assembly is a trailing edge limiter that is not part of the structure of the suspension and that is in the form of at least one first structural connection that extends between the flexure tongue and the bond pad platform.

Various refinements exist of the features noted in relation to the second aspect of the present invention. Further features may also be incorporated in the second aspect of the present invention as well. These refinements and additional features may exist individually or in any combination. The first structural connection may be of benefit in relation to restraining/limiting movement of the bond pad platform relative to the flexure during shipment of a suspension assembly (e.g., the suspension, flexure, bond pad platform, and a flex cable that includes the noted first electrical trace) to a vendor that will thereafter mount a slider assembly (collectively the slider positioner with the slider already mounted thereon) on the suspension assembly. That is, the first structural connection may function as an anti-shock device for the shipment of a suspension assembly to a vendor that will integrate a slider assembly with the suspension assembly to define the noted head-gimbal assembly. This functionality is commonly provided by what is characterized as a trailing edge limiter that is part of the structure of the suspension in prior art suspensions. The suspension used by the disk drive head-gimbal assembly of the second aspect does not include a trailing edge limiter. Instead, the disk drive head-gimbal assembly of the second aspect relies upon the first structural connection to provide an anti-shock function at least during shipment.

The disk drive head-gimbal assembly of the second aspect may be incorporated into a disk drive such that the first structural connection remains intact during normal disk drive operations (e.g., during rotation of a corresponding data storage disk and the exchange of signals between this data storage disk and one or more transducers that are embedded in or otherwise integrated with the slider). In this case, the existence of each first structural connection between the flexure tongue and bond pad platform should not adversely affect the ability of the slider positioner to change the position of the slider to an undesired degree. Another option would be for the disk drive head-gimbal assembly to retain the noted configuration until the slider assembly (again, collectively the slider positioner, with the slider mounted to the frame of the slider positioner) is mounted to the flexure tongue, but to sometime thereafter breach at least one (and including each) first structural connection that extends between the flexure tongue and the bond pad platform in any appropriate manner (e.g., fracture; remove at least in part). In either case, the disk drive head-gimbal assembly of the second aspect may be used in a disk drive of any appropriate type, size, shape, and/or configuration.

The first structural connection that extends between the flexure tongue and the bond pad platform in the case of the second aspect may be of any appropriate size, shape, and/or configuration, may be formed from any material or combination of materials, and may be disposed at any appropriate location. In one embodiment, a single first structural connection exists between the bond pad platform and the flexure tongue, and such is disposed along a central, longitudinal reference axis of the suspension. In another embodiment, multiple first structural connections exist between the bond pad platform and the flexure tongue. Any appropriate number of first structural connections may extend between the bond pad platform and the flexure tongue, and multiple first structural connections may be disposed in any appropriate arrangement.

It may be appropriate to integrally form the flexure tongue, at least one (and thereby including each) first structural connection, and the bond pad platform used by the disk drive head-gimbal assembly of the second aspect such that these three components are formed from a common material and such that no joint of any kind exists in this structure (e.g., no joint between the flexure tongue and the first structural connection; no joint between the first structural connection and the bond pad platform). It may also be appropriate for the first structural connection to be separately attached to the flexure tongue, to be separately attached to the bond pad platform, or both. For instance, what may be characterized as a dielectric substrate may be used to integrate the various electrical traces with the disk drive head-gimbal assembly. This dielectric substrate may include a bond pad platform section that is disposed on and appropriately attached to the bond pad platform (e.g., using an appropriate adhesive). The first structural connection may be formed from the dielectric substrate, and may extend from its bond pad platform section to the flexure tongue where it is disposed on and appropriately attached to the flexure tongue (e.g., using an appropriate adhesive). The bond pad platform section of the dielectric substrate and the first structural connection could be integrally formed in this case (e.g., no joint between the bond pad platform section of the dielectric substrate and the first structural connection).

Typically, the flexure tongue used by the disk drive head-gimbal assembly of the second aspect will deflect during normal disk drive operations such that the slider flies in a desired orientation (e.g., where its leading edge is spaced further from the corresponding data storage disk than the slider's trailing edge). For instance, first and second gimbal legs may flexibly support the flexure tongue, with the flexure tongue at least in effect cantilevering from these gimbal legs.

What is oftentimes referred to as a flex cable may be mounted on the bond pad platform used by the disk drive head-gimbal assembly of the second aspect. That portion of the flex cable that is disposed on the bond pad platform would typically include a plurality of bond pads or the like. An appropriate bond (e.g., a ball bond) would then electrically and structurally interconnect a bond pad on the bond pad platform with a corresponding pad on typically the trailing edge of the slider (e.g., to establish a number of desirable interconnections with the slider, such as for read/write operations, for fly height control). Another portion of the flex cable (not disposed on the bond pad platform as described) may include one or more electrical traces and associated bond pads for providing electrical signals to the slider positioner.

A third aspect of the present invention generally directed to a method for making a disk drive head-gimbal assembly. The method includes mounting a flexure to a suspension in any appropriate manner, where this flexure includes a flexure tongue. What may be characterized as a suspension assembly includes the flexure, the suspension, and a bond pad platform. A slider assembly is mounted to the flexure tongue after the flexure has been mounted to the suspension. Components of the slider assembly include a frame that is mounted on the flexure tongue, first and seconds actuators (e.g., piezoelectric devices) that are each mounted on the flexure tongue and that each engage the frame, and a slider that is mounted on this frame. The slider is electrically interconnected with at least one electrical trace using the noted bond pad platform. Movement of the bond pad platform is restrained by at least one structural connection that extends between the bond pad platform in the flexure tongue for at least some period of time.

Various refinements exist of the features noted in relation to the third aspect of the present invention. Further features may also be incorporated in the third aspect of the present invention as well. These refinements and additional features may exist individually or in any combination. For instance, the various features discussed above in relation to the first and second aspects may be used in this third aspect, individually or in any combination.

The structural connection(s) associated with the third aspect (that extend between the bond pad platform and the flexure tongue) may restrain movement of the bond pad platform relative to the flexure for at least a portion of the time between when the flexure is mounted to the suspension and the time when the slider assembly is mounted on the flexure tongue. Another option is for the structural connection(s) to restrain movement of the bond pad platform relative to the flexure throughout the time between when the flexure is mounted to the suspension and the time when the slider assembly is mounted on the flexure tongue.

The structural connection(s) associated with the third aspect (that extend between the bond pad platform and the flexure tongue) may be retained after the slider assembly has been mounted to the flexure tongue, and further may be retained for normal disk drive operations (e.g., during the rotation of one or more data storage disks and where one or more signals are being exchanged between the data storage disk and one or more transducers of a corresponding slider). Another option would be to breach at least one (and including each) such structural connection in an appropriate manner (e.g., fracturing; removal of at least part of the relevant structural connection) and at an appropriate time after the slider assembly has been mounted on the flexure tongue, thereby terminating the ability of the structural connection(s) to restrain movement of the bond pad platform relative to the flexure.

Each structural connection that extends between the flexure tongue and the bond pad platform may provide an anti-shock function in the case of the third aspect. For instance, the flexure may be mounted on the suspension by a first vendor. The first vendor may then ship the suspension assembly to a second vendor at a different location (e.g., air delivery; ground delivery), at which time the slider assembly will then be mounted on the flexure tongue by the second vendor. Each structural connection that extends between the flexure tongue and the bond pad may be primarily for restraining movement of the bond pad platform relative to the flexure for the shipment of the suspension assembly from the first vendor to the second vendor.

A fourth aspect of the present invention generally directed to a method for making a disk drive head-gimbal assembly. The method includes mounting a flexure to a suspension in any appropriate manner, where this flexure includes a flexure tongue. What may be characterized as a suspension assembly includes the flexure, the suspension, and a bond pad platform. This suspension assembly is shipped, and at least during this shipment movement of the bond pad platform is at least somewhat restrained by at least one structural connection that extends between the bond pad platform and the flexure tongue. A slider assembly is mounted to the flexure tongue after the shipment of the suspension assembly has been received. Components of the slider assembly include a frame that is mounted on the flexure tongue, first and seconds actuators (e.g., piezoelectric devices) that are each mounted on the flexure tongue and that each engage the frame, and a slider that is mounted on this frame. The slider is electrically interconnected with at least one electrical trace using the noted bond pad platform.

Various refinements exist of the features noted in relation to the fourth aspect of the present invention. Further features may also be incorporated in the fourth aspect of the present invention as well. These refinements and additional features may exist individually or in any combination. For instance, the various features discussed above in relation to the first and second aspects may be used in this fourth aspect, individually or in any combination.

The structural connection(s) associated with the fourth aspect (that extend between the bond pad platform and the flexure tongue) may restrain movement of the bond pad platform relative to the flexure for at least a portion of the time between when the flexure is mounted to the suspension and the time when the slider assembly is mounted on the flexure tongue. Another option is for the structural connection(s) to restrain movement of the bond pad platform relative to the flexure throughout the time between when the flexure is mounted to the suspension and the time when the slider assembly is mounted on the flexure tongue.

The structural connection(s) associated with the fourth aspect (that extend between the bond pad platform and the flexure tongue) may be retained after the slider assembly has been mounted to the flexure tongue, and further may be retained for normal disk drive operations (e.g., during the rotation of one or more data storage disks and where one or more signals are being exchanged between the data storage disk and one or more transducers of a corresponding slider). Another option would be to breach at least one (and including each) such structural connection in an appropriate manner (e.g., fracturing; removal of at least part of the relevant structural connection) and at an appropriate time after the slider assembly has been mounted on the flexure tongue, thereby terminating the ability of the structural connection(s) to restrain movement of the bond pad platform relative to the flexure.

Each structural connection that extends between the flexure tongue and the bond pad platform may provide an anti-shock function in the case of the fourth aspect. For instance, the flexure may be mounted on the suspension by a first vendor. The first vendor may then ship the suspension assembly to a second vendor at a different location (e.g., air delivery; ground delivery), at which time the slider assembly will then be mounted on the flexure tongue by the second vendor. Each structural connection that extends between the flexure tongue and the bond pad may be primarily for restraining movement of the bond pad platform relative to the flexure for the shipment of the suspension assembly from the first vendor to the second vendor.

DETAILED DESCRIPTION OF THE INVENTION

Figure 1:
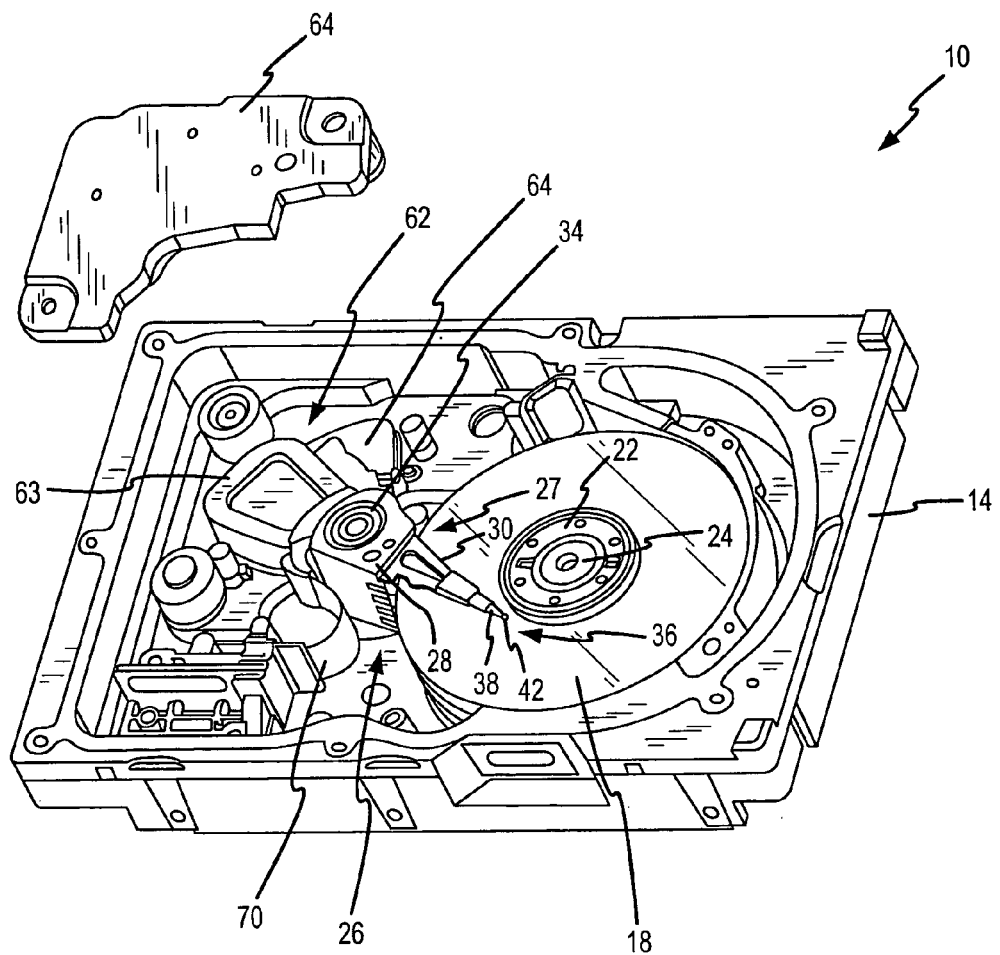
FIG. 1 is a perspective view of a prior art disk drive that may be adapted to incorporate a disk drive head-gimbal assembly with an integrated flexure limiter in the form of a structural connection between the flexure tongue and the bond pad platform.
Figure 2:
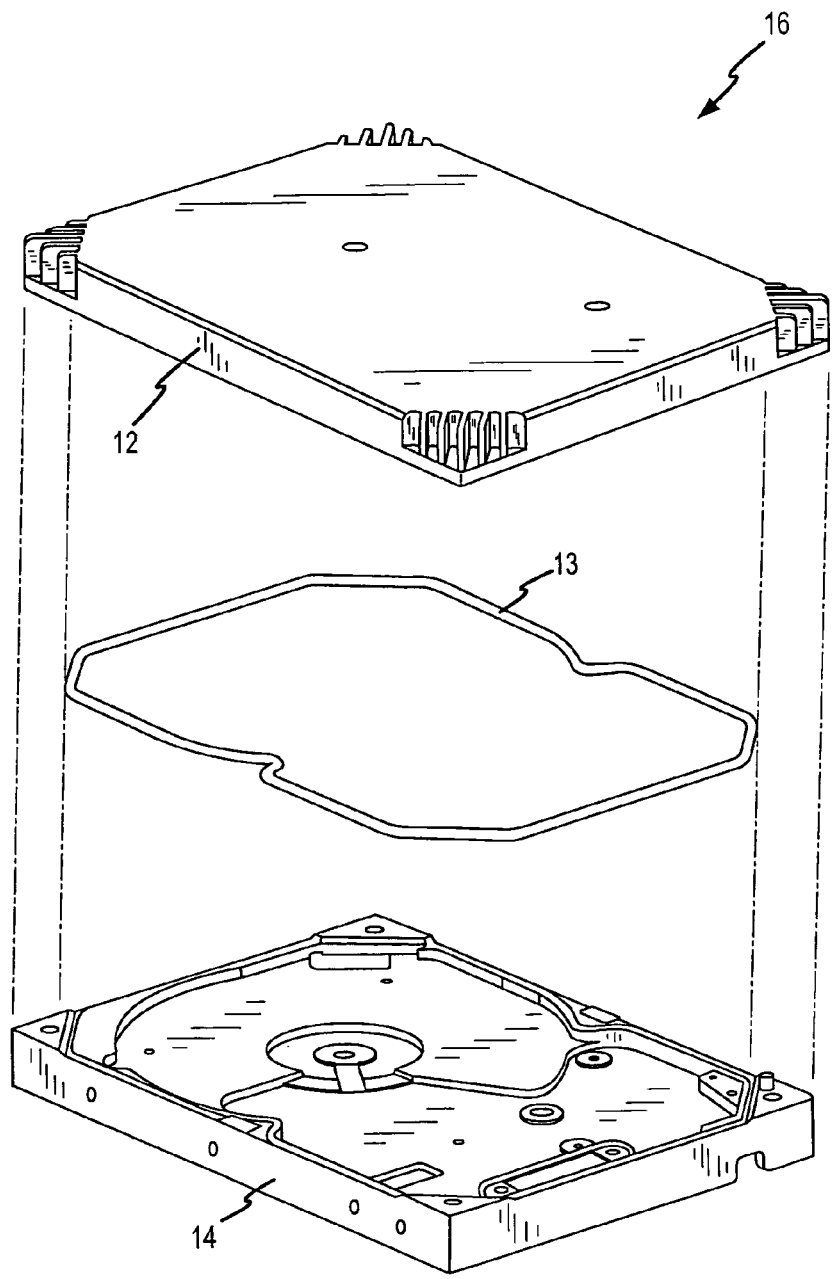
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a disk drive head-gimbal assembly with an integrated flexure limiter in the form of a structural connection between the flexure tongue and the bond pad platform and that will be discussed below in relation to FIGS. 6A-C and 7, the combination of which is not in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

What may be characterized as a head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
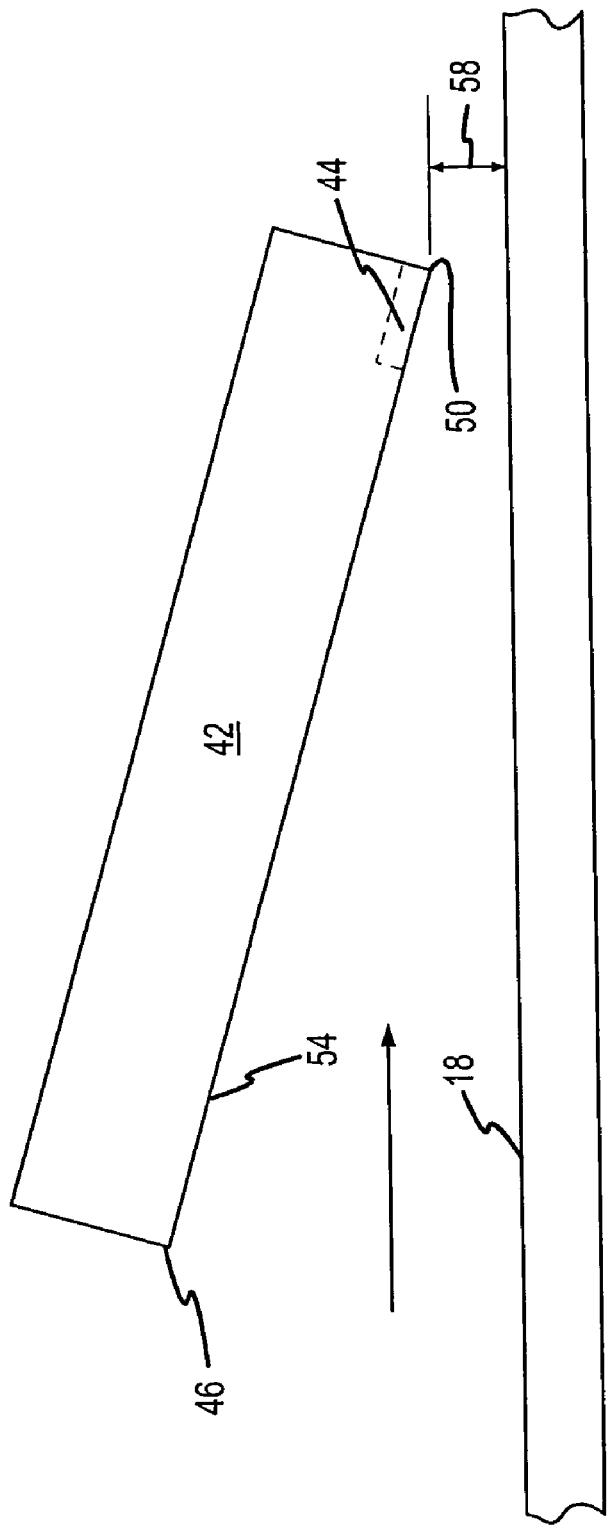
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
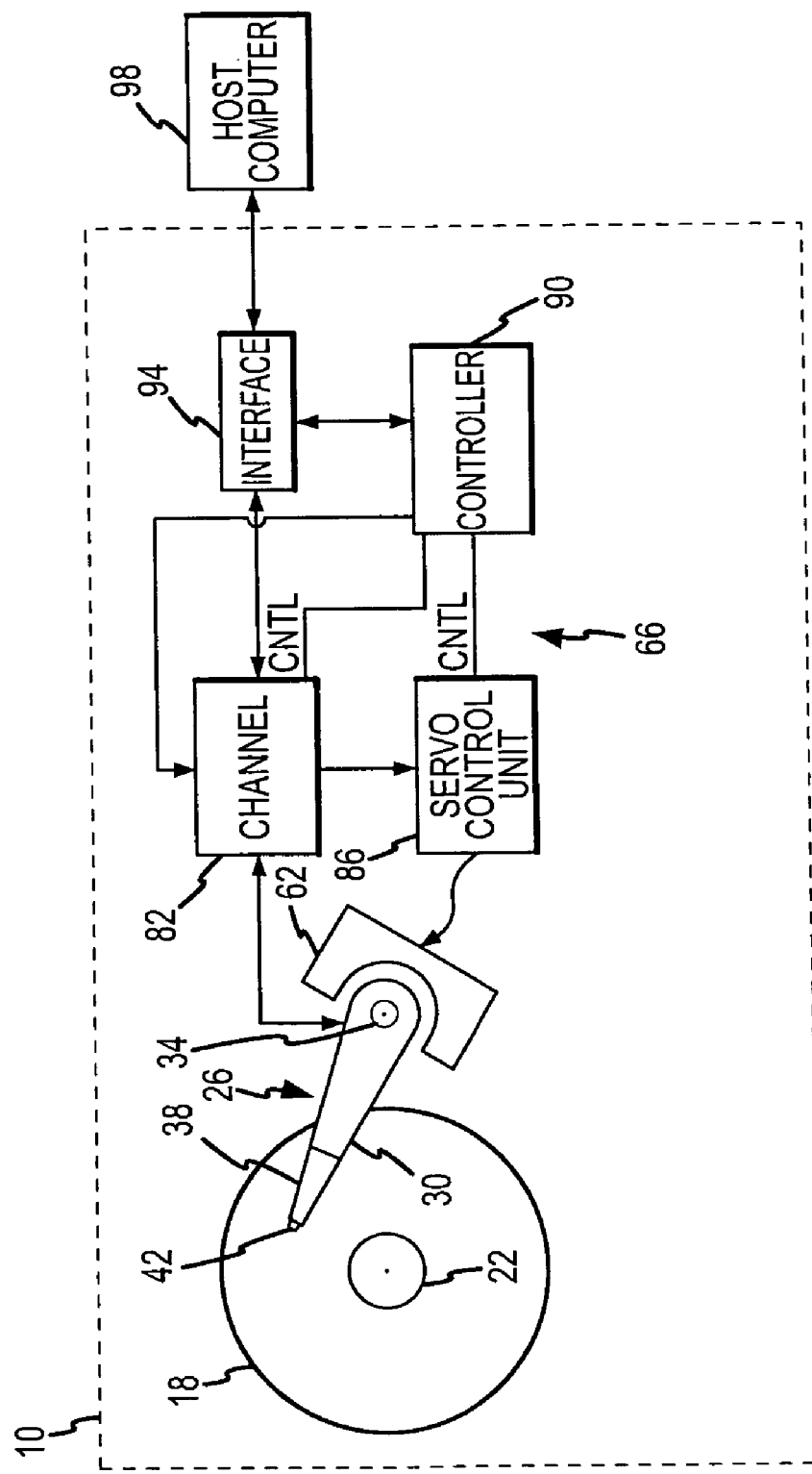
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94.

Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98. One embodiment of a head-gimbal assembly that may be used in place of the head-gimbal assembly 36 in the disk drive 10 is illustrated in FIGS. 5A-D and is identified by reference numeral 100. The head-gimbal assembly 100 generally includes suspension 108, an electrical trace assembly or a flex cable 101, a flexure 115, and what may be characterized as a slider assembly 136. The suspension 108, flex cable 101, and flexure 115 may be of any appropriate size, shape, and/or configuration, and may be characterized as a suspension assembly. Generally, the suspension 108 biases the slider assembly 136 toward its corresponding data storage disk; the flexure 115 provides a desired interconnection between the slider assembly 136 and the suspension 108; the flex cable 101 provides electrical signals to and receives electrical signals from the slider assembly 136; and the slider assembly 136 communicates with its corresponding data storage disk.

The flexure 115 is appropriately mounted on the suspension 108 at one or more locations, and includes a pair of deflectable gimbal legs 132 to movably support the slider assembly 136 relative to the suspension 108. In this regard, the flexure 115 further includes a flexure tongue 128 that is supported by the gimbal legs 132. The flexure tongue 128 at least generally pivots about at least somewhat of a predefined axis relative to the gimbal legs 132. Typically, this pivot axis will be at least generally perpendicular to the long axis of the suspension 108. A dimple or other protrusion (not shown) is included on the suspension 108 and engages the side of the flexure tongue 128 that is opposite the side on which the slider assembly 136 is mounted.

The suspension 108 includes both a leading edge limiter 113 and a trailing edge limiter 114 to establish a maximum displacement of the leading and trailing edges, respectively, of the flexure tongue 128 relative to the suspension 108. The suspension 108 also includes a lift tab 112 for use in parking the head-gimbal assembly 100. Engagement of this lift tab 112 with an appropriate load/unload ramp exerts a force on the suspension 108 to increase the vertical spacing between the slider assembly 136 and its corresponding data storage disk. The leading edge limiter 113 and/or trailing edge limiter 114 of the suspension 108 may engage the flexure 115 at this time, as a suction force may still be "pulling" the slider 140 toward its corresponding data storage disk during the parking operation.

The slider assembly 136 is mounted on the flexure tongue 128 such that the trailing edge of the slider assembly 136 is disposed at or close to the hinge of the flexure tongue 128. An enlarged view of the slider assembly 136 is presented in FIG. 5B. There are two main components of the slider assembly 136—a slider 140 and what may be characterized as a slider position control microactuator or slider positioner 156. The slider 140 may be of any appropriate size, shape, and/or configuration. Generally, the slider 140 includes an air bearing surface 142 (the surface of the slider 140 that projects toward its corresponding data storage disk during disk drive operations, and that is contoured to exert forces on the slider 140 to allow it to "fly" above its corresponding data storage disk during disk drive operations, typically in closely spaced relation), a leading edge 144, a trailing edge 148, and a read/write head 152. The fluid (e.g., air) flows relative to the slider 140 from its leading edge 144 to its trailing edge 148 during disk drive operations. The illustrated slider 140 is of the "flying type," and its leading edge 144 will be spaced further from its corresponding data storage disk than its trailing edge 148 during disk drive operations. The leading edge 144 of the slider 140 is allowed to move further away from its corresponding data storage disk than the trailing edge 148 of the slider 140 by a pivoting of the flexure tongue 128 at least generally about an axis.

The slider positioner 156 is used to position the slider 140 (more specifically its read/write head 152) relative to a certain track of the corresponding data storage disk. The slider positioner 156 is generally in the form of a frame 160 and a pair of actuators 172. The frame 160 is appropriately mounted on the flexure tongue 128, and includes a base 164, as well as a pair of arms 168 that are spaced along the base 164, that each cantilever from the base 164, and that are able to move relative to the flexure tongue 128. A pair of slots 166 is formed in the base 164 at the corner between each arm 168 and the base 164. These slots 166 extend completely through the frame 160, and are of a uniform width along their entire length. A first material 170 (e.g., an epoxy or adhesive) is disposed within each of the slots 166 in order to reduce the potential for cracking of the frame 160 at the junction between the arms 168 and the base 164, and also to structurally reinforce the frame 160.

The slider 140 is positioned within the space collectively defined by the pair of arms 168 and the distal end 165 of the base 164. Typically, there will be a space between the slider 140 and each of the arms 168, as well as a space between the leading edge 144 of the slider 140 and the distal end 165 of the base 164. A first material 182 (e.g., an epoxy or adhesive) is used to fix a portion of the slider 140 to each of the arms 168. This first material 182 is typically disposed toward the free ends of the arms 168.

Figure 5A:
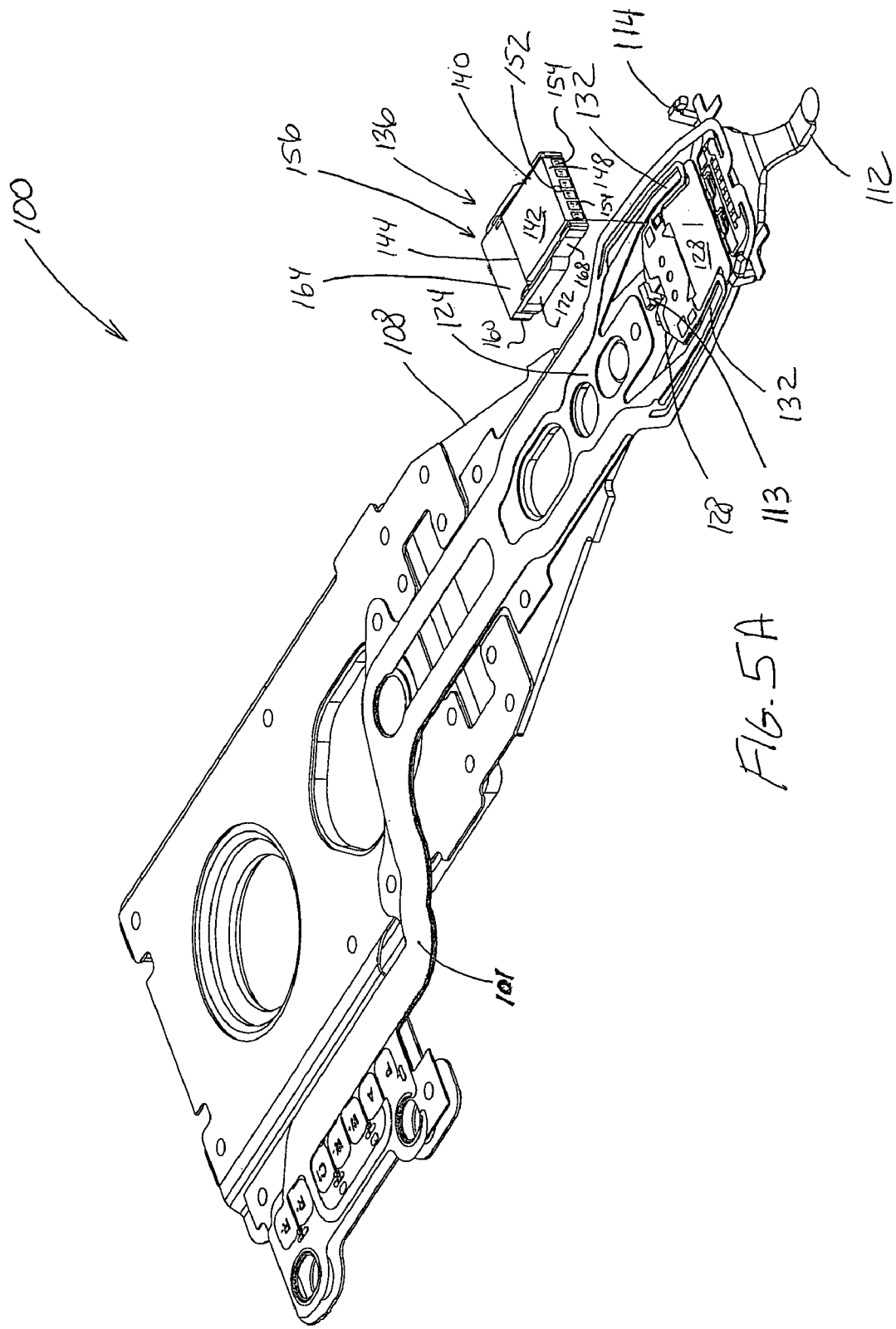
FIG. 5A is a perspective view of a head-gimbal assembly that may be used by the disk drive of FIG. 1.
Figure 5B:
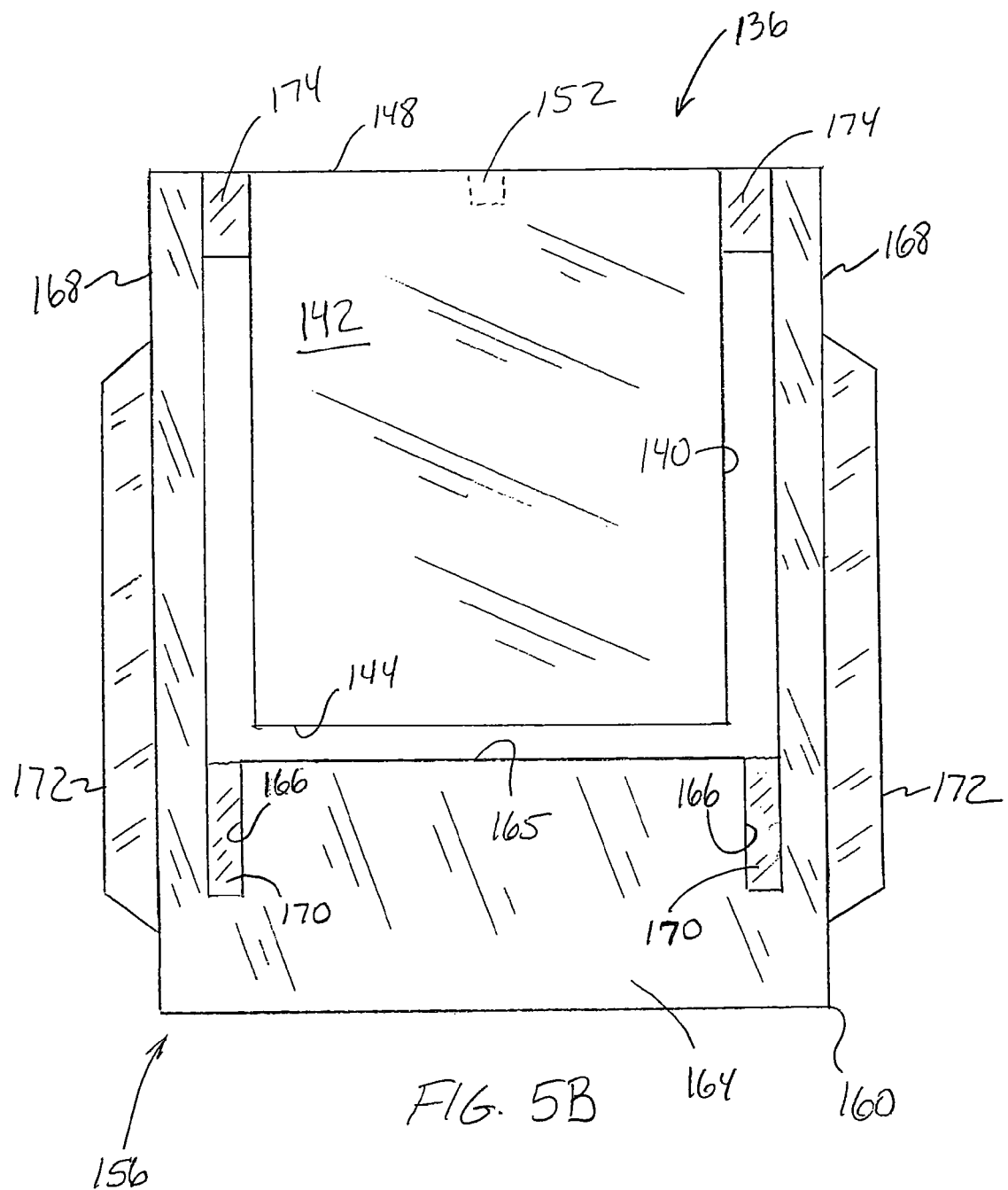
FIG. 5B is a bottom view of a disk drive slider positioner or slider position control microactuator used by the head-gimbal assembly of FIG. 5A.
Figure 5C:
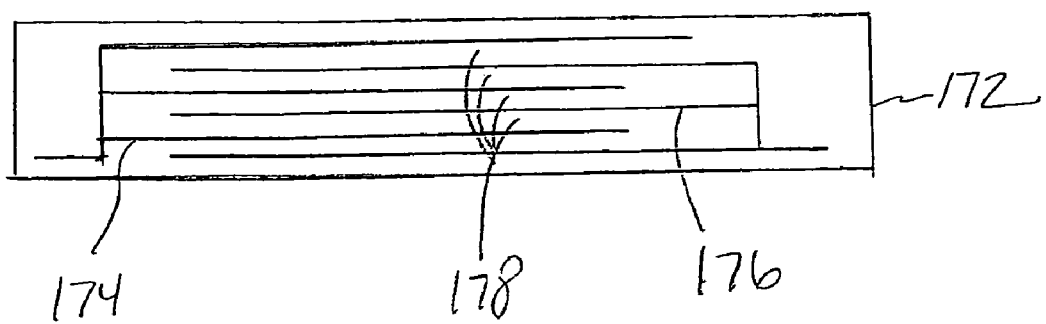
FIG. 5C is a schematic of one of the piezoelectric elements used by the disk drive slider positioner of FIGS. 5A-B.

An actuator 172 is provided for each of the arms 168 of the frame 160, and each is in the form of what may be characterized as a piezoelectric element (e.g., a plurality of piezoelectric layers 178, along with appropriate electrode layers (signal electrode layers 176 and ground electrode layers 174, as illustrated in FIG. 5C)). The actuators 172 may be operated to exert a force on their corresponding arm 168 to deflect the same relative to the base 164 of the frame 160. This of course changes the position of the slider 140 relative to the base 164 and flexure tongue 128, and more pertinently changes the position of its read/write head 152 relative to its corresponding data storage disk.

Figure 5D:
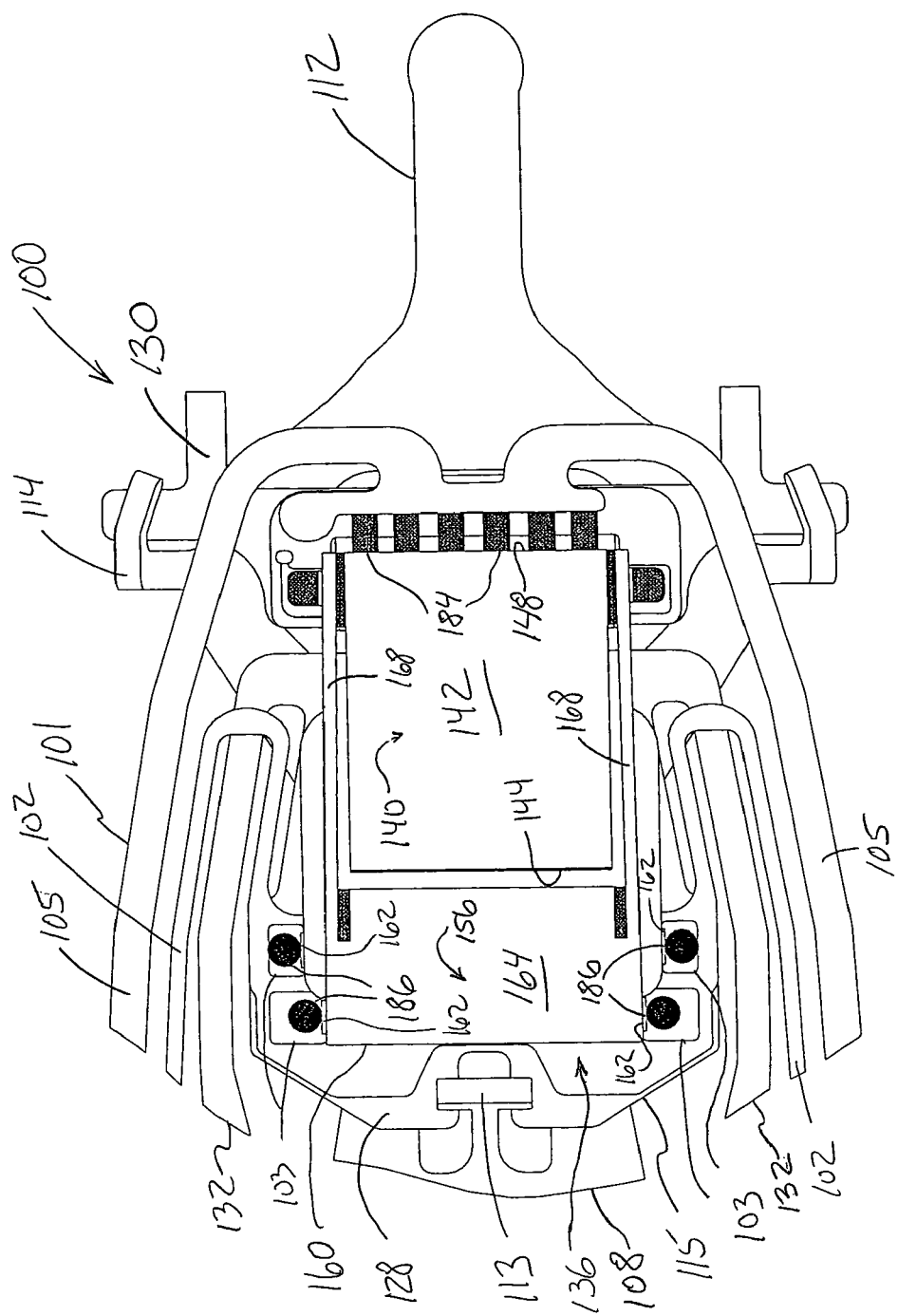
FIG. 5D is an enlarged view of a portion of the head-gimbal assembly of FIG. 5A.

FIG. 5D is an enlarged view of the slider assembly 136 and other adjacent portions of the head-gimbal assembly 100. As previously noted, the flex cable 101 provides signals to and receives signals from the slider assembly 136. In this regard, the flex cable 101 includes a pair of microactuator trace sections 102 (each including one or more individual electrical traces (not shown in FIG. 6)) and corresponding microactuator bond pads 103 for communicating with the microactuator 156 of the slider assembly 136. A microactuator ball bond 186 electrically interconnects each microactuator bond pad 103 with a corresponding microactuator electrical terminal or connection pad 162 on the microactuator 156. The microactuator ball bond 186 should be a suitably electrically conductive material (e.g., gold), as it is part of the communication path to/from the microactuator 156. An appropriate electrical signal may be provided to the microactuator 156 via an electrical path that includes one or more electrical traces of a microactuator trace section 102, a corresponding microactuator bond pad 103, a corresponding microactuator ball bond 186, and a corresponding microactuator connection pad 162.

Continuing to refer to FIG. 5D, the flex cable 101 further includes a pair of slider trace sections 105 (each including one or more individual electrical traces (not shown in FIG. 5D)) and corresponding slider bond pads (not shown in FIG. 5D) for communicating with the slider 140, more specifically its read/write head 152. One or more electrical traces could also be incorporated into the slider trace sections 105 for providing a fly height control signal or any other relevant functionality that may be incorporated by the slider 140. In any case, a slider ball bond 184 electrically interconnects each slider bond pad of the flex cable 101 with a corresponding slider electrical terminal or connection pad 154 (e.g., FIG. 5A) on the slider 140. Each slider ball bond 184 should be a suitably electrically conductive material (e.g., solder), as it is part of the communication path to/from the slider 140. An appropriate electrical signal may be provided to or transmitted from the slider 140 via one or more electrical traces of a slider trace section 105, a corresponding slider bond pad of the flex cable 101, a corresponding slider ball bond 184, and a corresponding slider connection pad 154.

FIG. 5D also illustrates certain details regarding the flexure 115. Instead of the slider assembly 136 being mounted solely on the flexure tongue 128 of the flexure 115, the slider assembly 136 is also mounted on what may be characterized as a bond pad platform 130 of the flexure 115 that is spaced from the flexure tongue 128. Generally, the slider bond pads of the flex cable 101 that electrically communicate with the slider 140 are associated with the bond pad platform 130. Stated another way, a trailing portion of the slider 140 is associated with the bond pad platform 130, while a leading portion of the slider 140 is associated with the flexure tongue 128. Therefore, the only "interconnection" between the bond pad platform 130 and the flexure tongue 128 would be that one part of the slider assembly 136 is mounted on the flexure tongue 128 and a different part of the slider assembly 136 is mounted on the bond pad platform 130.

Figure 6A:
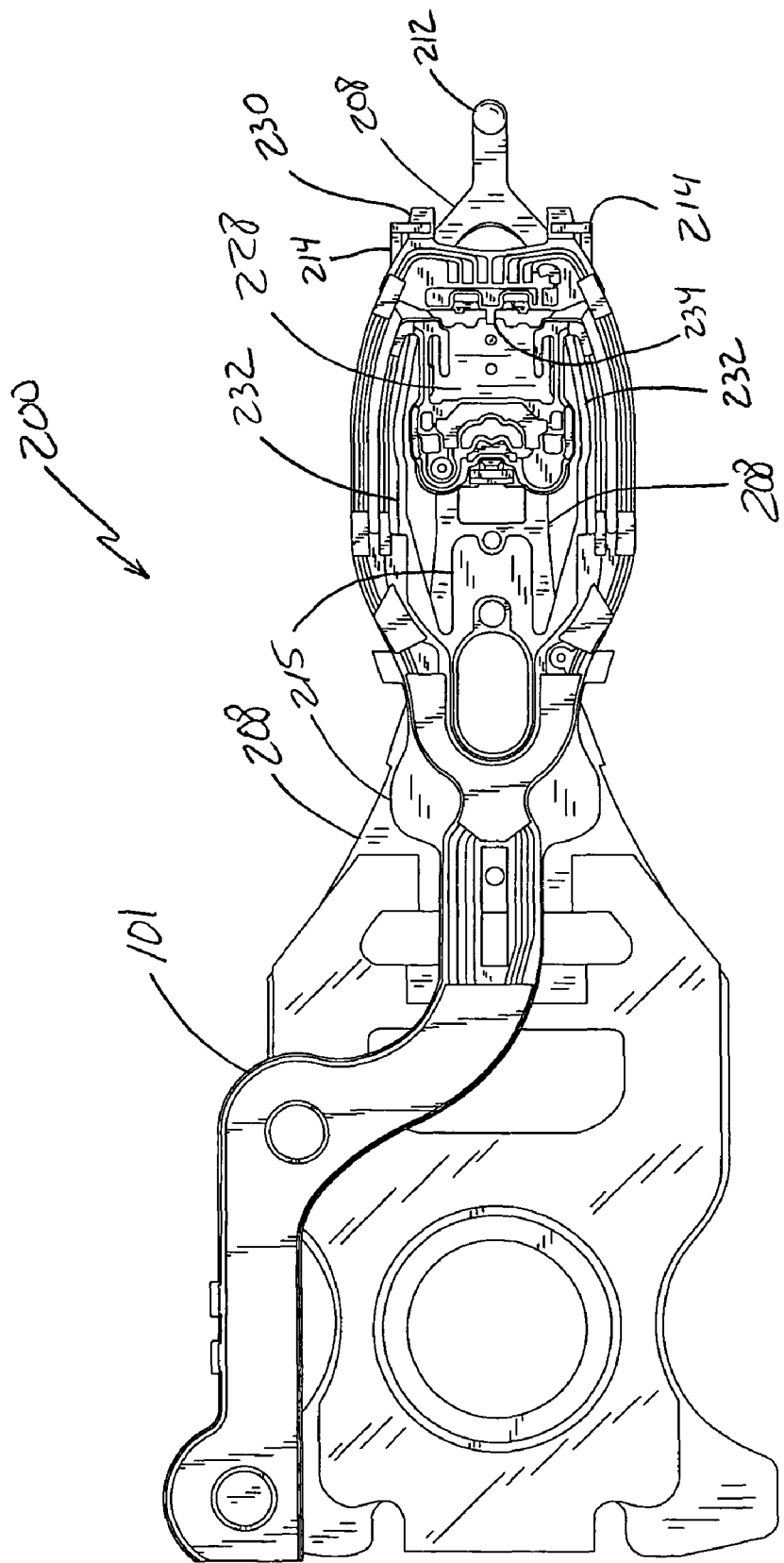
FIG. 6A is a plan view of one embodiment of a head-gimbal assembly (without the slider assembly) that may be used by the disk drive of FIG. 1 and that includes an integrated flexure limiter in the form of a structural interconnection between the flexure tongue and the bond pad platform.
Figure 6B:
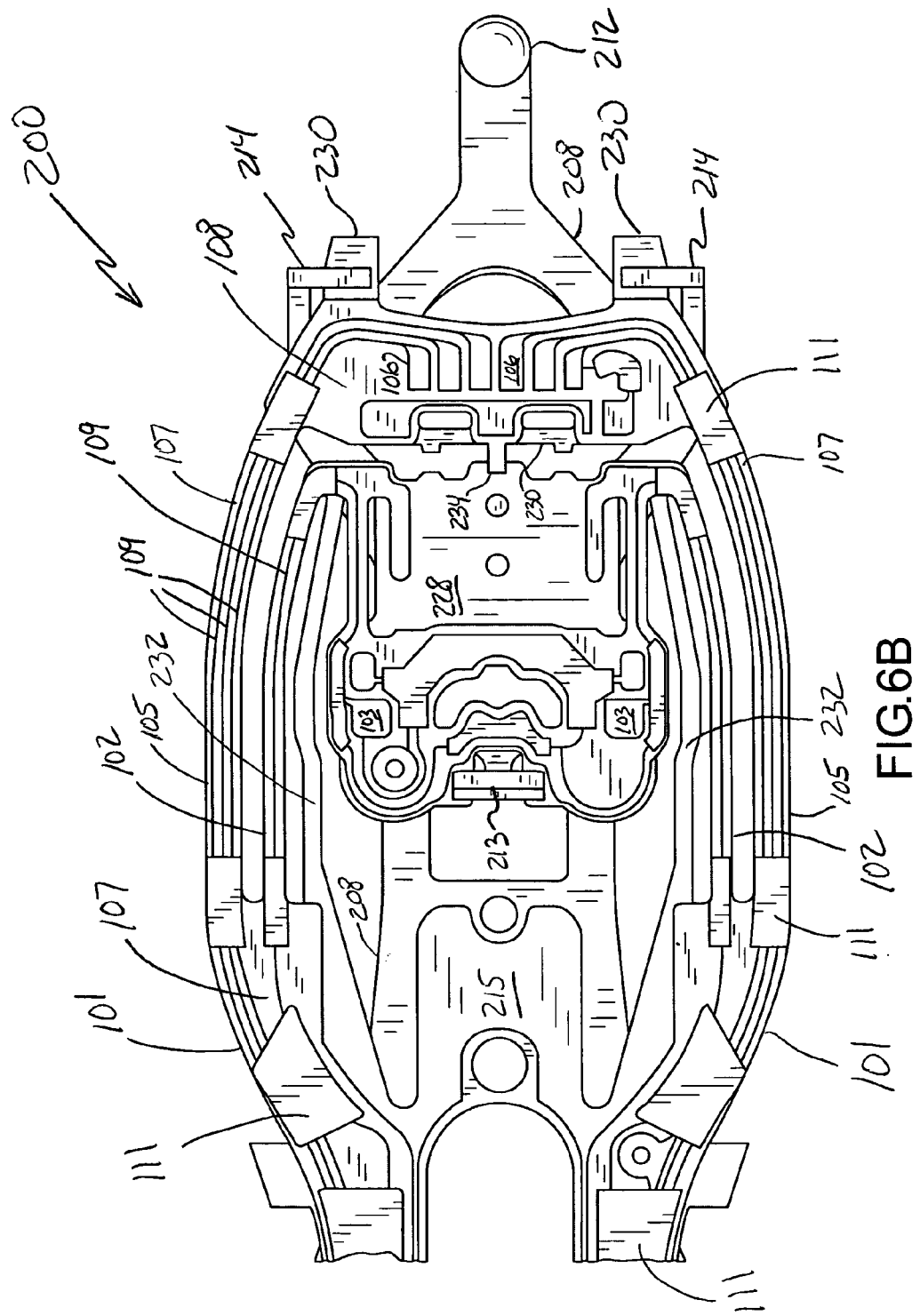
FIG. 6B is an enlarged view of the flexure tongue region of the head-gimbal assembly of FIG. 6A.
Figure 6C:
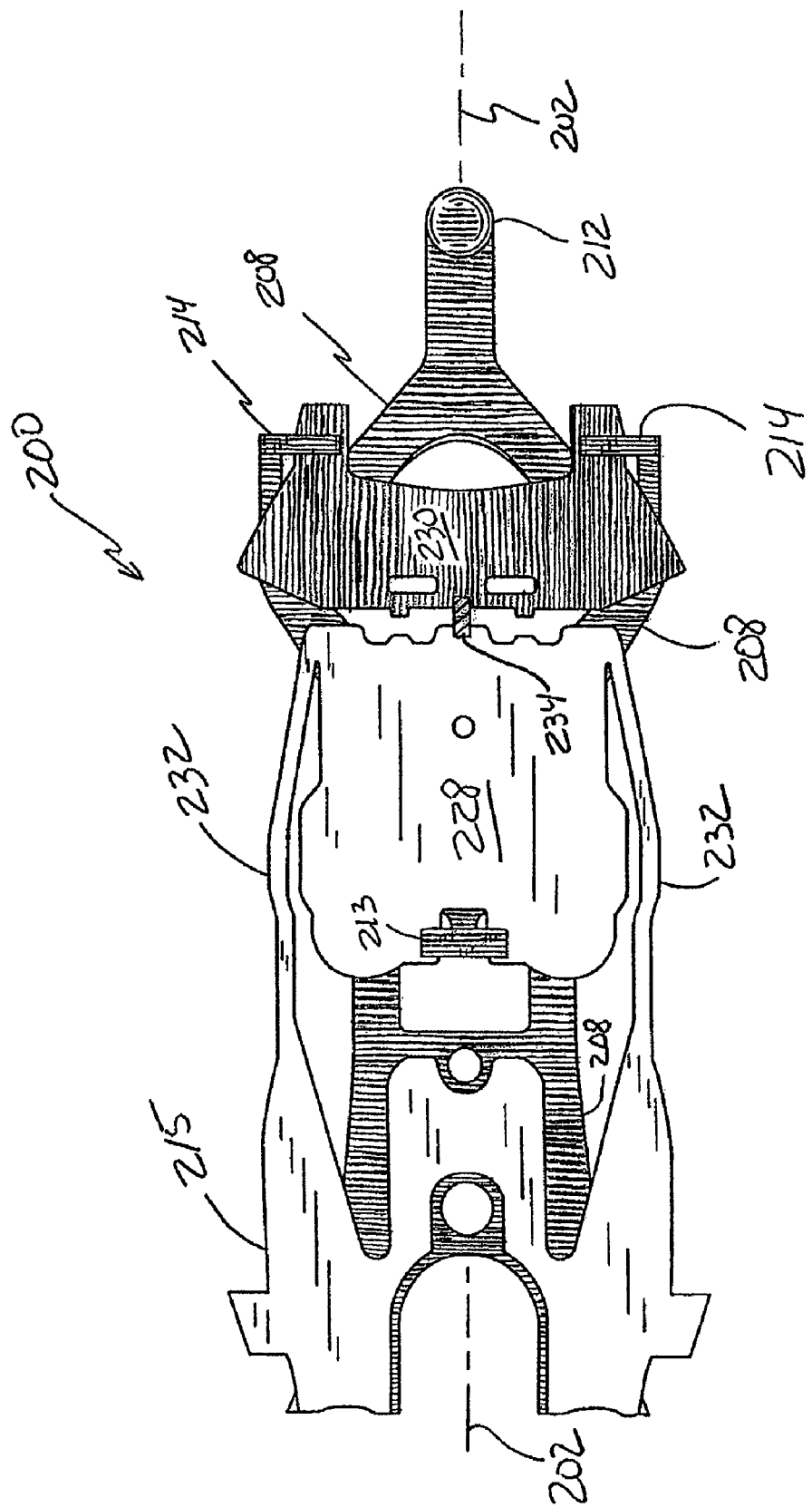
FIG. 6C is an enlarged, plan view of the structural interconnection between the flexure tongue and the bond pad platform of the head-gimbal assembly of FIG. 6A, with the flex cable having been removed.

FIGS. 6A-C illustrate one embodiment of a head-gimbal assembly that may be used in place of the head-gimbal assembly 36 in the disk drive 10, that uses what may be characterized as an integrated flexure limiter in the form of a structural interconnection between the flexure tongue and the bond pad platform, and that is identified by reference numeral 200. The head-gimbal assembly 200 generally includes a suspension 208, an electrical trace assembly or a flex cable 101, a flexure 215, a bond pad platform 230, and a slider assembly (not shown in FIGS. 6A-C, but generally in the form of a slider positioner and a slider, such as the above-noted slider assembly 136). The suspension 208, flex cable 101, and flexure 215 each may be of any appropriate size, shape, and/or configuration, and may be characterized as a suspension assembly. Hereafter, the head-gimbal assembly 200 will be described in relation to the slider assembly 136, although other slider assembly configurations having a slider positioner and a slider may be appropriate for the head-gimbal assembly 200 as well. Generally, the actuator arm 204 moves the suspension 208 (e.g., through a voice coil motor) so as to align the read/write head 152 of the slider assembly 136 with a certain location of the corresponding data storage disk; the slider positioner 156 refines the position of the read/write head 152 of the slider assembly 136 as desired/required; the suspension 208 biases the slider assembly 136 toward its corresponding data storage disk; the flexure 215 provides a desired interconnection between the slider assembly 136 and the suspension 208; the flex cable 101 provides electrical signals to and receives electrical signals from the slider assembly 136; and the slider assembly 136 communicates with its corresponding data storage disk during disk drive operations. The flexure 215 is appropriately mounted on the suspension 208 at one or more locations, and includes a pair of deflectable gimbal legs 232 to flexibly/movably support the slider assembly 136 relative to the suspension 208. In this regard, the flexure 215 further includes a flexure tongue 228 that is supported by the gimbal legs 232. The flexure tongue 228 at least generally pivots about at least somewhat of a predefined axis relative to the gimbal legs 232. Typically, this pivot axis will be at least generally perpendicular to the long axis of the suspension 208 (e.g., corresponding with axis 202). A dimple or other protrusion (not shown) is included on the suspension 208 and engages the side of the flexure tongue 228 that is opposite the side on which the slider assembly 136 is mounted (on the opposite side of the flexure 215 compared to that illustrated in FIGS. 6A-C).

The suspension 208 includes both a leading edge limiter 213 and a trailing edge limiter 214 to establish a maximum displacement of the leading edge of the flexure tongue 228 relative to the suspension 208, as well as a trailing edge limiter 214 to establish a maximum displacement of the bond pad platform 230 relative to the flexure 215. As will be discussed in more detail below, the trailing edge limiter 214 may be alleviated based upon the inclusion of a bridge 234 between the flexure tongue 228 and the bond pad platform 230. The suspension 208 also includes a lift tab 212 for use in parking the head-gimbal assembly 200. Engagement of this lift tab 212 with an appropriate load/unload ramp exerts a force on the suspension 208 to increase the vertical spacing between the slider assembly 136 and its corresponding data storage disk. The leading edge limiter 213 may engage the flexure 215 at this time (it may be such that the trailing edge limiter 214 of the suspension 208 engages the bond pad platform 230 at this time as well), as a suction force may still be "pulling" the slider 140 of the slider assembly 136 toward its corresponding data storage disk during the parking operation.

The slider assembly 136 is mounted on the flexure tongue 228 such that the trailing edge 148 of the slider assembly 136 is aligned with the bond pad platform 230, which is spaced from the flexure tongue 228. Generally, the slider bond pads 106 of the flex cable 101 that electrically communicate with the slider 140 are disposed on the bond pad platform 230. Typically, the flex cable 101 (e.g., a bond pad platform section 108 of the flex cable 101) would be appropriately secured to the bond pad platform 230 (e.g., using an appropriate adhesive). Slider solder ball bonds 184 (or any other appropriate bond) would thereby both electrically and structurally interconnect each slider bond pad 106 of the flex cable 101 with a corresponding slider connection pad 154 on the trailing edge 148 of the slider 140.

The flexure tongue 228 and the bond pad platform 230 are structurally interconnected prior to mounting the slider assembly 136 on the suspension assembly in the illustrated embodiment. At least one bridge 234 extends between and structurally interconnects the flexure tongue 228 with the bond pad platform 230. More than one bridge 234 may be utilized, and each bridge 234 may be disposed at any appropriate location. However, the bridge(s) 234 would typically be symmetrically positioned relative to a central, longitudinal axis 202 associated with the head-gimbal assembly 200 (which also corresponds with the central, long axis of the suspension 208). For instance, the head-gimbal assembly 200 could include a pair of bridges 234 in the arrangement illustrated in the FIG. 7 embodiment that is addressed below. Any appropriate number of bridges 234 may be utilized. Each bridge 234 need not be of the same size, shape, configuration, and/or material, although such may be the case.

Each bridge 234 may be of any appropriate size, shape, and/or configuration, and may be formed from any appropriate material or combination of materials. In the illustrated embodiment, the bridge 234 is defined by a dielectric substrate 107 that is used by the flex cable 101. The various electrical traces 109/pads (e.g., microactuator bond pads 103; slider bond pads 106) of the flex cable 101 are disposed on the dielectric substrate 107 so as to electrically isolate the electrical traces 109 and bond pads of the flex cable 101 from both the suspension 208 and the flexure 215 (the suspension 208 and flexure 215 typically being metal, such as stainless steel). One or more cover layer sections 111 may be disposed over the electrical traces 109 and/or bond pads of the flex cable 101 at one or more locations as desired/required.

The dielectric substrate 107 includes a bond pad platform section 108 that is disposed on and appropriately secured to the bond pad platform 230 (e.g., using an appropriate adhesive). The bridge(s) 234 is part of the dielectric substrate 107 in the embodiment of FIGS. 6A-C, extends from the bond pad platform section 108 and to the flexure tongue 228 where it is disposed on and appropriately secured to the flexure tongue 228 (e.g., using an adhesive). The bridge(s) 234 may be integrally formed with the bond pad platform section 108, (e.g., no joint of any kind therebetween) of the dielectric substrate 107 of the flex cable 101.

Figure 7:
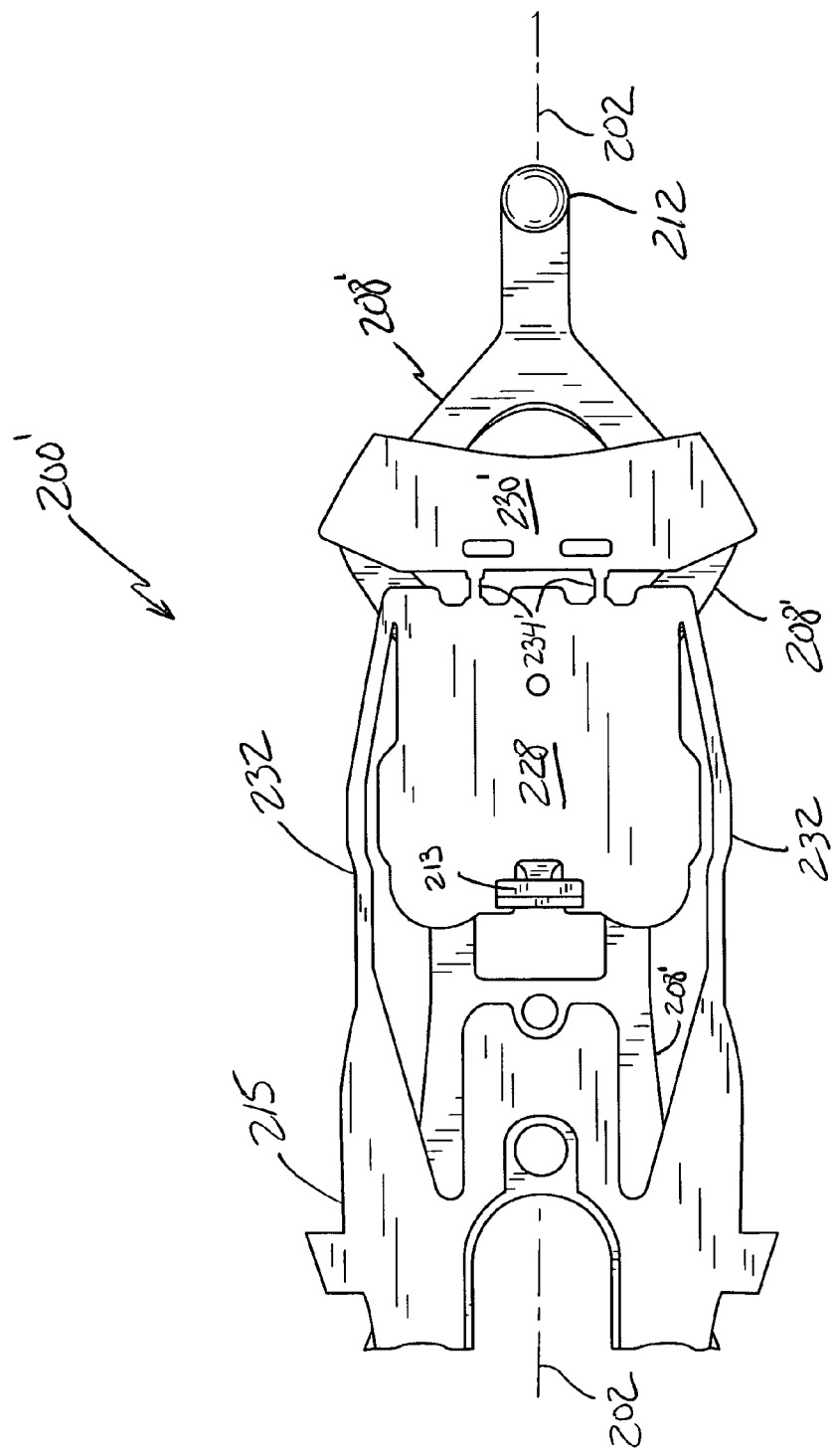
FIG. 7 is a plan view of one embodiment of a head-gimbal assembly that may be used by the disk drive of FIG. 1 and that includes an integrated flexure limiter in the form of a structural interconnection between the flexure tongue and the bond pad platform, and with the flex cable having been removed.

FIG. 7 illustrates a variation of the head-gimbal assembly 200 of FIGS. 6A-C. Common components between the embodiments of FIG. 7 and FIGS. 6A-B are identified by a common reference numeral. A "single time" designation is used to identify those corresponding components that differ in at least one respect. The primary difference between these two embodiments is that the head-gimbal assembly 200' of FIG. 7 uses a pair of bridges 234' that are symmetrically disposed on opposite sides of the central, longitudinal axis 202, and that are integrally formed with the flexure tongue 228 and the bond pad platform 230. That is, the flexure tongue 228, the bond pad platform 230, and each interconnecting bridge 234' are formed in a manner such that there is no joint between any bridge 234' and either of the flexure tongue 228 and the bond pad platform 230 (e.g., formed from stainless steel, although other materials may be appropriate). Any appropriate number of bridges 234' of the type described with regard to the head-gimbal assembly 200' of FIG. 7 could be utilized and disposed in any appropriate arrangement, including using a single bridge 234' in the same position as the bridge 234 of the FIG. 6A embodiment. It should also be noted that the suspension 208' in the case of the head-gimbal assembly 200' does not include any trailing edge limiters 214, as the bridges 234' now provide the function previously provided by the trailing edge limiters 214. However, the head-gimbal assembly 200' could use the suspension 208 (FIG. 6C) with its trailing edge limiters 214.

It should be appreciated that the type of bridge 234 used by the head-gimbal assembly 200 of FIG. 6A could be used in the arrangement of bridges 234' used by the head-gimbal assembly 200' of FIG. 7, and vice versa. It should also be appreciated that one or more bridges 234 and one or more bridges 234' could be used in combination to structurally interconnect the flexure tongue 228 and bond pad platform 230. Finally, one or more bridges need not be part of the bond pad platform section 108 of the flex cable 101, and may be separately attached to each of the flexure tongue 228 and bond pad platform 230.

The number, configuration, and/or arrangement of the bridge(s) 234 used by the head-gimbal assembly 200 of FIGS. 6A-B and the bridge(s) 234' used by a head-gimbal assembly 200' of FIG. 7 (or any other bridge(s) for that matter) may be selected so as to suitably support/restrain movement of the bond pad platform 230 at least until after the slider assembly 136 is mounted on the suspension assembly (e.g., mounted on the flexure tongue 228). In one embodiment, the bridge(s) 234/234' remains structurally intact until after the slider assembly 136 is integrated with the suspension assembly, but at least one, and more typically each such bridge 234/234' is thereafter breached in any appropriate manner (e.g., fractured; removed at least in part) so that the bridge(s) 234/234' does not provide a structural interconnection between the flexure tongue 228 and the bond pad platform 230 during normal disk drive operations. In another embodiment, the intention is for the bridge(s) 234/234' to remain structurally intact even after the slider assembly 136 has been integrated with the suspension assembly. As such, the flexure tongue 228 and the bond pad platform 230 would still be structurally interconnected by one or more bridge(s) 234/234' during normal disk drive operations. It should be appreciated that retaining the structural interconnection between the flexure tongue 228 and the bond pad platform 230 via one or more bridges 234/234' for normal disk drive operations should preferably not adversely affect disk drive operations. For instance, the configuration, number, and/or arrangement of structurally intact bridges 234/234' should be such that the bridge(s) 234/234' will not adversely affect to an undesired degree the ability of the slider positioner 156 to reposition the slider 140 during normal disk drive operations.

The manufacture, production or assembly of the head-gimbal assembly 200/200' may very well entail multiple vendors. For instance, one vendor may mount the flexure 215 to the suspension 208, and further may mount the flex cable to relevant portions of the flexure 215 and/or bond pad platform 230. This suspension assembly may then be shipped (e.g., air delivery; ground delivery) to another vendor that will then mount the slider assembly 136 onto this suspension assembly. The above-described bridges 234/234' may be primarily of benefit for shock prevention during shipment—they reduce the potential that the bond pad platform 230 will move relative to the flexure 215 an amount that is likely to damage unsupported portions of the flex cable. This is also the primary purpose of the trailing edge limiters 214 of the suspension 208. As such, in one embodiment a head-gimbal assembly that includes one or more bridges between the flexure tongue and the bond pad platform uses a suspension without any trailing edge limiters. However, the trailing edge limiters of a suspension could be retained even when the head-gimbal assembly includes one or more bridges between the flexure tongue and the bond pad platform.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive head-gimbal assembly, comprising:
   a suspension;
   a flexure interconnected with said suspension and comprising a deflectable flexure tongue;
   a slider mounted to said flexure tongue and comprising a trailing edge;
   a bond pad platform spaced from said flexure tongue;
   a first structural connection extending between said flexure tongue and said bond pad platform such that the first structural connection spans about a shortest distance between the flexure tongue and the bond pad platform; and
   a first electrical trace interconnected with said slider using said bond pad platform.

2. The disk drive head-gimbal assembly of claim 1, wherein said first structural connection is disposed along a central, longitudinal reference axis of said head-gimbal assembly.

3. The disk drive head-gimbal assembly of claim 1, further comprising at least two said first structural connections.

4. The disk drive head-gimbal assembly of claim 1, wherein said flexure tongue, said first structural connection, and said bond pad platform are integrally formed.

5. The disk drive head-gimbal assembly of claim 1, further comprising a dielectric section that in turn comprises first and second dielectric sections that are integrally formed, wherein said first dielectric section is disposed on and attached to said bond pad platform, and wherein said second dielectric section extends from said first dielectric section and is disposed on and is attached to said flexure tongue to define said first structural connection, and wherein said disk drive head-gimbal assembly further comprises at least one electrical trace disposed on said first dielectric section.

6. The disk drive head-gimbal assembly of claim 1, further comprising:
   a trailing edge limiter.

7. The disk drive head-gimbal assembly of claim 1, wherein said flexure further comprises first and second gimbal legs that merge with and flexibly support said flexure tongue.

8. The disk drive head-gimbal assembly of claim 1 wherein the slider further comprises a slider positioner mounted on the flexure tongue and comprising a frame, a first actuator, and a second actuator.

9. The disk drive head-gimbal assembly of claim 8, wherein the first actuator and the second actuator comprise piezoelectric elements.

10. A disk drive head-gimbal assembly, comprising:
    a suspension;
    a flexure interconnected with said suspension and comprising a flexure tongue;
    a slider mounted to said flexure tongue and comprising a trailing edge;
    a bond pad platform spaced from said flexure tongue and aligned with said trailing edge of said slider;
    at least one first structural connection that is entirely separate from said suspension and extends directly between said flexure tongue and said bond pad platform; and
    a first electrical trace interconnected with said slider using said bond pad platform.

11. The disk drive head-gimbal assembly of claim 10, wherein said first structural connection is disposed along a central, longitudinal reference axis of said head-gimbal assembly.

12. The disk drive head-gimbal assembly of claim 10, further comprising at least two said first structural connections.

13. The disk drive head-gimbal assembly of claim 10, wherein said flexure tongue, said first structural connection, and said bond pad platform are integrally formed.

14. The disk drive head-gimbal assembly of claim 10, further comprising a dielectric section that in turn comprises first and second dielectric sections that are integrally formed, wherein said first dielectric section is disposed on and attached to said bond pad platform, and wherein said second dielectric section extends from said first dielectric section and is disposed on and is attached to said flexure tongue to define said first structural connection, and
    wherein said disk drive head-gimbal assembly further comprises at least one electrical trace disposed on said first dielectric section.

15. The disk drive head-gimbal assembly of claim 10, wherein said flexure further comprises first and second gimbal legs that merge with and flexibly support said flexure tongue.

16. The disk drive head-gimbal assembly of claim 10 wherein the slider further comprises a slider positioner mounted on the flexure tongue and comprising a frame, a first actuator, and a second actuator.

* * * * *